Patented Feb. 8, 1927.

1,617,098

UNITED STATES PATENT OFFICE.

HENRY BLUMENBERG, JR., OF LOS ANGELES, CALIFORNIA, ASSIGNOR TO STOCKHOLDERS SYNDICATE, OF LOS ANGELES, CALIFORNIA, A CORPORATION OF CALIFORNIA.

PROCESS OF MAKING METAL PHOSPHATES.

No Drawing.  Application filed May 8, 1925. Serial No. 29,647.

My invention relates to a process of making metal phosphates, and in particular, a lead phosphate, and has for its object a simple efficient and economic process to produce metal phosphates by the reaction of a metal oxide and ammonium di-hydrogen phosphate.

My invention consists in the steps of the process hereinafter described and claimed.

I take litharge, PbO, and mix the same with ammonium di-hydrogen phosphate. The mixture is then heated until all the ammonia and steam formed by the reaction is driven off, leaving as the end product, lead phosphate, in accordance with the following equation:

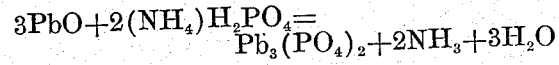
$$3PbO + 2(NH_4)H_2PO_4 = Pb_3(PO_4)_2 + 2NH_3 + 3H_2O$$

In place of lead oxide, zinc or any other metal oxide which will decompose ammonium di-hydrogen phosphate may be used, resulting in the corresponding metal phosphate.

The oxide of any metal which is more electro-positive than lead is suitable for my process, for such metal oxides will decompose ammonium di-hydrogen phosphate.

Various changes may be made in the steps of the process by those skilled in the art without departing from the spirit of my invention, as claimed.

I claim:

A process of making lead phosphate, comprising mixing litharge and ammonium dihydrogen phosphate and heating the mixture to drive off the ammonia and water formed, whereby lead phosphate is produced.

In testimony whereof I have signed my name to this specification.

HENRY BLUMENBERG, JR.